J. M. FORSHEE.
MILO MAIZE HEADING MACHINE.
APPLICATION FILED FEB. 12, 1912.
1,053,804.
Patented Feb. 18, 1913.
3 SHEETS—SHEET 1.
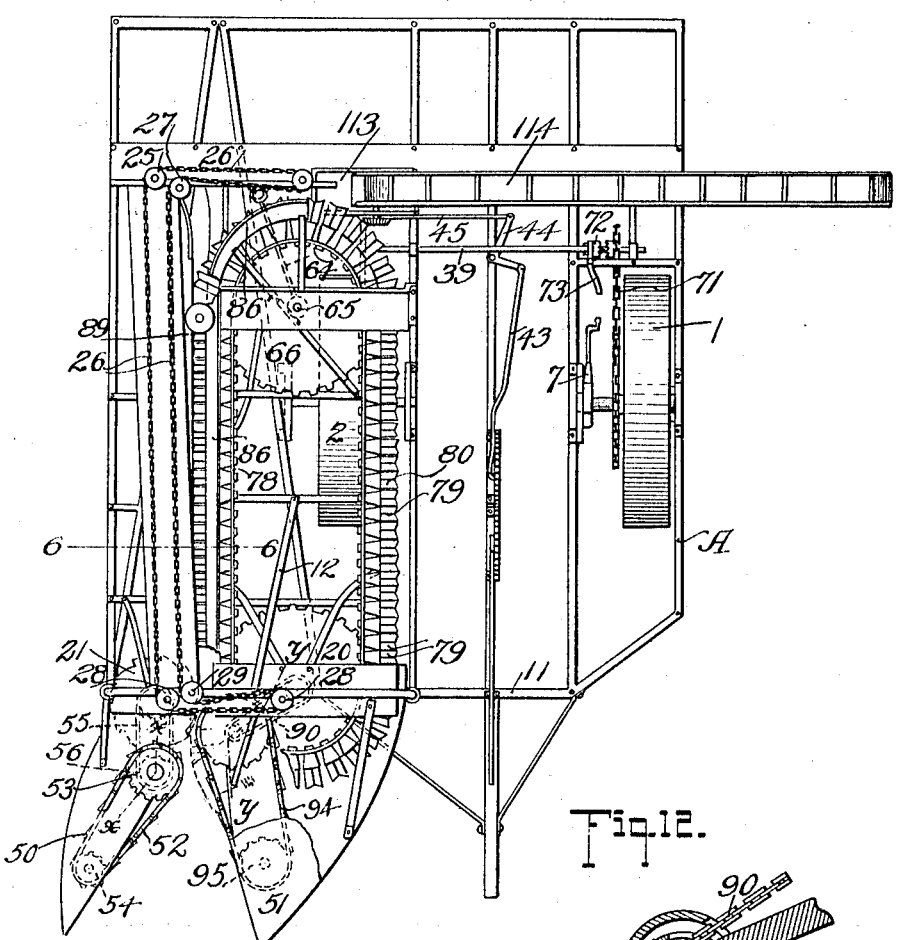

J. M. FORSHEE.
MILO MAIZE HEADING MACHINE.
APPLICATION FILED FEB. 12, 1912.
1,053,804.
Patented Feb. 18, 1913.
3 SHEETS—SHEET 2.
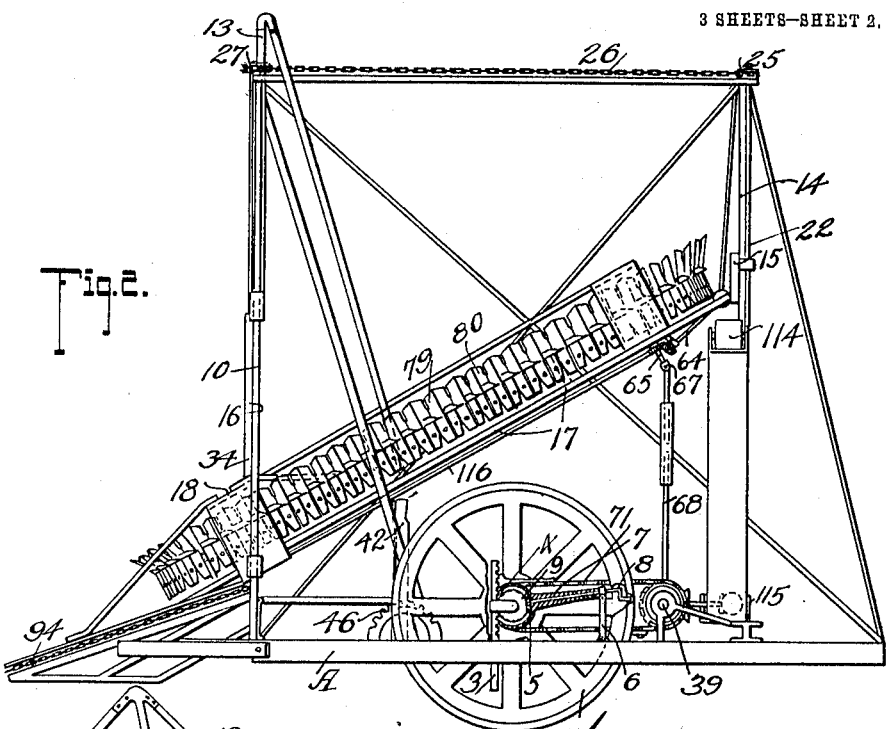
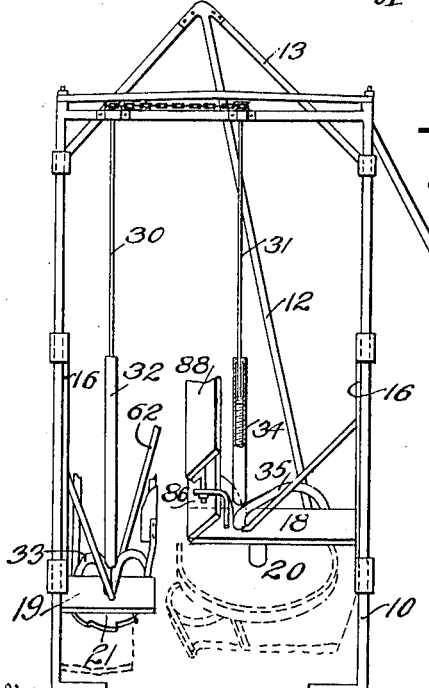
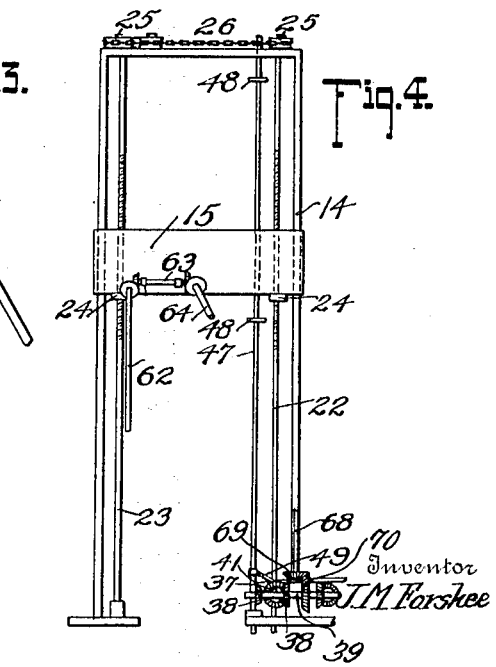

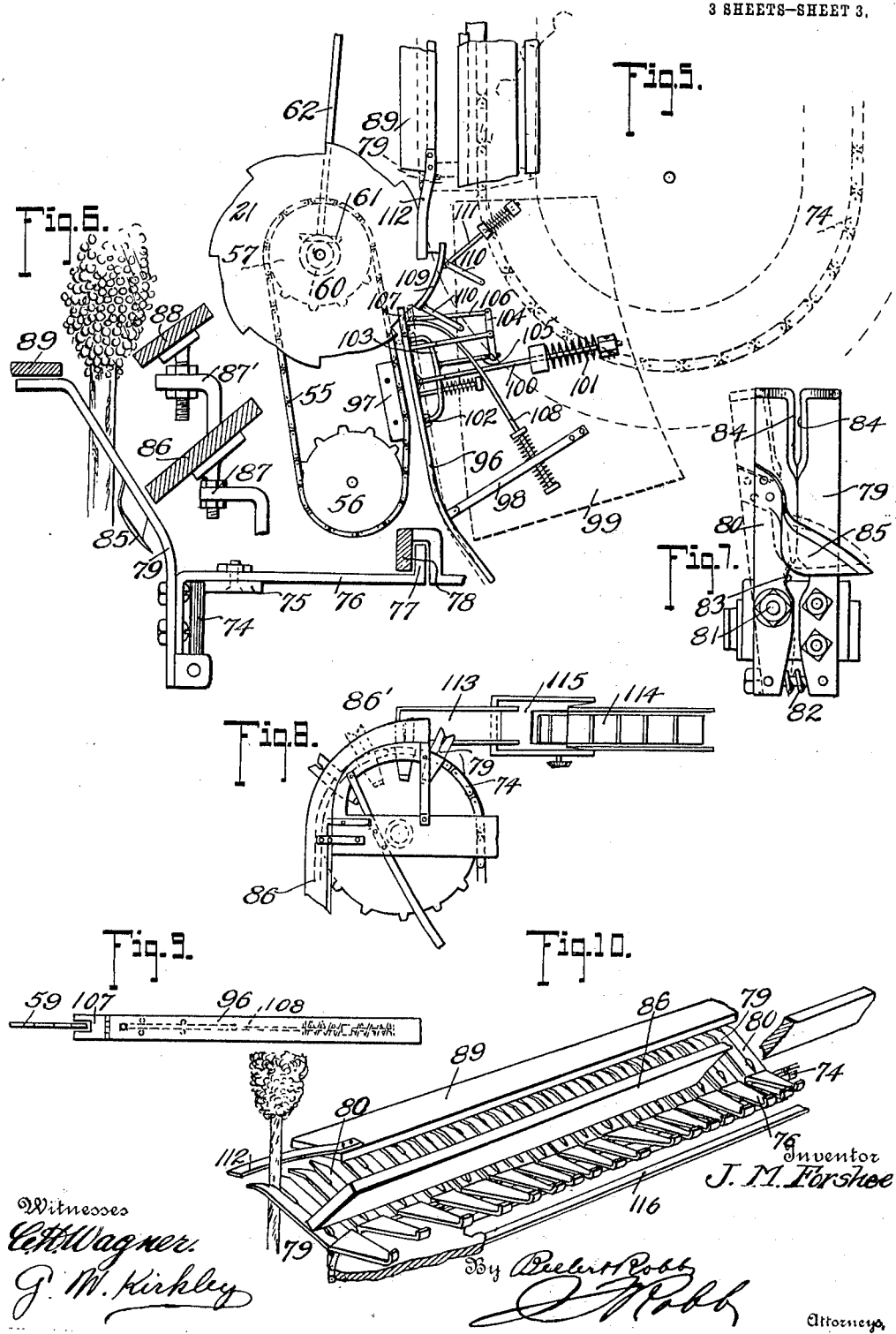

UNITED STATES PATENT OFFICE.

JOSEPH M. FORSHEE, OF HOOKER, OKLAHOMA.

MILO-MAIZE-HEADING MACHINE.

1,053,804.  Specification of Letters Patent.  Patented Feb. 18, 1913.

Application filed February 12, 1912.  Serial No. 676,965.

*To all whom it may concern:*

Be it known that I, JOSEPH M. FORSHEE, a citizen of the United States, residing at Hooker, in the county of Texas and State of Oklahoma, have invented certain new and useful Improvements in Milo-Maize-Heading Machines, of which the following is a specification.

In the western part of our country at the present time, there is being grown very extensively a species of corn, commonly called milo-maize, or Kafir-corn. This product is especially advantageous for growth in territory subject to droughts, and makes a good yield under conditions very adverse to the production of good crops of ordinary corn. The milo-maize or Kafir-corn in growth comprises stalks and heads and is planted in rows like Indian corn, growing to a height of two to six feet. At the present time, this new species of corn is headed by hand at considerable expense. I believe that a machine, or machines have been devised especially for heading milo-maize or Kafir-corn, but such machines have not been practical because too much of the stalk of the corn is cut in the heading operation of the machine.

The present invention comprises a machine which is especially adapted for use in heading the species of corn above described, the heading mechanism being designed with a view of operating to sever the head from the stalk, carrying as little of the stalk as practicable.

The invention contemplates the provision of certain adjusting mechanism permitting the use of the machine in heading corn of different heights, and header devices are associated with gage means by which the amount of stalk severed with the head may be quite accurately determined.

The invention includes a special form of header device operated to engage the stalk of the corn as it is gathered by the machine and being maintained in such engagement while the stalk passes through the machine. A cutter is carried by the header device and severs the head from the stalk at a predetermined time, said severed head being supported by said device until a clearing member forcibly removes the head therefrom to permit it to drop or pass to a conveyer.

The invention includes other peculiar devices and mechanisms coöperating in a manner which will be more fully understood upon reference to the following detail description and to the accompanying drawings, in which—

Figure 1 is a top plan view showing a machine embodying the invention, a portion of the header chain being broken away adjacent to the feed wheel to bring out more clearly the connection of a driving chain leading from the lower header wheel to a driving wheel for the adjacent gathering chain. Fig. 2 is a side elevation of the machine. Fig. 3 is a front view of a portion of the machine, showing more clearly the arrangement and bracing of the front supporting yoke and the mounting of the lifting screws of the lifting yoke. Fig. 4 is a sectional view showing more clearly the arrangement of the rear supporting yoke and lifting bar. Fig. 5 is a plan view showing more clearly the feeding mechanism located adjacent to the gathering boards, the latter being omitted along with other parts illustrated in Fig. 1. Fig. 6 is a sectional view taken about on the line 6—6 of Fig. 1. Fig. 7 is a side view of one of the header devices, showing clearly the mounting of its jaw members and cutting knife. Fig. 8 is a fragmentary view showing in top plan the arrangement of the upper end of the clearing board or member in relation to the header devices. Fig. 9 is a fragmentary view showing the pressure plate and a portion of the feed wheel in operative relation thereto. Fig. 10 is a fragmentary perspective view of a portion of the header chain and illustrating the manner in which the header devices engage with the stalk of corn as the latter is fed thereto. Fig. 11 is a sectional view taken about on the line $x$—$x$ of Fig. 1. Fig. 12 is a similar view taken about on the line $y$—$y$ of Fig. 1. Fig. 13 is a plan view showing more clearly the gearing of the drive mechanism located on the main frame approximately below the upper header wheel.

Throughout the following description and on the several figures of the drawings, similar parts are referred to by like reference characters.

In the drawings, A denotes the main frame of the machine which is supported upon the ground wheels 1 and 2. In order that the main frame may be raised and lowered with respect to the ground wheels, a rack 3 is carried by the frame at a side of each ground wheel and is engaged with a gear 4 supported by a gear casing 5 which is loosely mounted on the axle of the adjacent ground wheel, but prevented from rotation by means of a link 6 connected to an arm 7 on the casing. A shaft 8 having a hand crank carries also a gear 9 engaging the gear 4 to operate the same while the latter is in mesh with a tooth of the rack 3. By operating the crank shaft 8, the frame A may be raised or lowered with respect to the axis of the ground wheels 1 and 2 and one or more of the devices just described may be associated with each ground wheel. Any other special type of lifting means may be employed in substitution of that just described, however.

The frame A at the side remote from the ground wheel 1 is practically suspended at its front portion by means of a supporting yoke 10 with which a brace 11 is connected, a second brace 12 extending from the middle portion of the frame A upwardly above the yoke 10. An angular bracket 13 is carried by the upper end of the brace 12 and has its lower ends attached to the supporting yoke 10 to firmly hold the latter and assist in maintaining the suspended portion of the frame A connected to the yoke 10 comparatively rigid.

At the rear end portion of the frame A and in rear of the yoke 10 is another supporting yoke 14, shown in Fig. 4, the same being narrower than the yoke 10 and carrying a transverse lifting bar 15 adapted to slide vertically on said yoke 14. A lifting or vertically movable yoke 16 is slidable upon the front supporting yoke 10 and the members 15 and 16 support an inclined header frame 17 on which the heading mechanism is mounted. At its lower end, which is located between the sides of the yokes 10 and 16, the header frame 17 has the horizontal U-shaped supporting brackets 18 and 19, the lower header wheel 20 being mounted on the bracket 18 and a feed wheel 21 on the bracket 19. The header frame 17 is connected in any substantial way at its lower portion to the lower end of the lifting yoke 16 and the upper rear end of the header frame is attached substantially to the lifting bar 15. The brackets 18 and 19 are, of course, carried by the lower end of the header frame. The header mechanism is mounted on the header frame and will be described hereinafter. It is contemplated that said header mechanism may be raised or lowered bodily in order to accommodate it for different heights of corn, and thus render the header means most effective in operation. The means for raising and lowering the frame 17 with the header mechanism thereon comprises lifting screws 22 and 23 mounted adjacent to the rear yoke 14 and coöperating with nuts 24 which are carried by the lifting bar 15 supported by said yoke. The sprocket gears 25 at the upper ends of the lifting screws are connected by a sprocket chain 26, said sprocket chain engaging with the above mentioned gears 25 and passing around an idler gear 27 and thence extending to the front portion of the machine. At the front portion of the machine, the chain 26 engages sprocket gears 28 and another idler 29. The gears 28 are mounted at the upper ends of the front lifting screws 30 and 31, the screw 30 being mounted in a threaded sleeve 32 which is supported by a V-shaped arm 33 which extends over the bracket 19. In like manner, the screw 31 is mounted in a threaded sleeve 34 which is supported by an arm 35 that projects above the bracket 18. It will thus be apparent that when the screw 22 is rotated, the various screws 23, 30 and 31 will be simultaneously rotated and since the arms 33 and 35 are carried by the frame 17 of the header mechanism, such rotation of all the screws will lift the yoke 16 and bar 15, or lower the same, according to the direction of the rotation. In this way, the header mechanism may be adjusted to any suitable height at the will of the operator, the driving of the lifting screws being accomplished by the provision of a swinging shaft 36, shown in Fig. 13, said shaft having a gear 37 adapted to be moved with the shaft into mesh with either of two beveled gears 38 which are in spaced relation and mounted on a drive shaft 39. The swinging shaft 36 has a second gear 40 meshing with a beveled gear 41 on the lower end of the screw 22. Movement is imparted to the shaft 36 to throw the gear 37 from a central non-operating position, into mesh with either of the gears 38 by a manually operable lever 42 connected by a rod 43 with a bell crank 44, which latter is connected by a rod 45 with the shaft 36. Since the lever 42 is readily accessible to the operator of the machine, the raising and lowering of the header mechanism may be easily controlled and the lever 42 is positioned by the usual toothed segment 46 and a catch on the lever to coöperate therewith (see Fig. 2).

A vertical shifting rod 47 is mounted in the rear yoke 14 and has stops 48 in its length arranged above and below the lifting bar 15. At its lower end, the rod 47 has a link connection 49 with the shaft 36 so that the bar 15, as it approaches its extreme limits of movement, is adapted to engage one or the other of stops 48 and move the rod 47 longitudinally to cause it to actuate the shaft 36 to carry the latter into a position in which its gear 37 will be disengaged from the gears 38, this operation automatically discontinuing any raising or lowering movement of the frame 17 with the header mechanism.

At the front portion of the machine are arranged the gathering boards 50 and 51 which are somewhat similar to those of an ordinary harvesting machine, being adapted to gather and guide the stalks to certain feeding and header mechanism hereinafter described. Associated with the gathering board 50 is a feed chain 52 which passes around suitable sprocket wheels 53 and 54. The chain 52 is driven by a driving and feeding chain 55, shown best in Fig. 5, said chain 55 passing around sprockets 56 and 57. The shafts of the sprocket wheels 53 and 56 are operatively connected by a universal joint 58, shown in Fig. 11 and on the shaft of the sprocket 57 is mounted the feed wheel 21 and the beveled gear 60. The gear 60 is in mesh with a second gear 61 on a shaft 62, which shaft 62 is driven by gears connecting it with a transverse shaft 63 and a short countershaft 64. The shaft 64 is geared to another shaft 65, shown in Fig. 2, as supporting the upper header wheel 66. The lower end of the shaft 65 is connected by a universal connection 67 with a vertical drive shaft 68 composed of sections adjustably connected and the lower end of the shaft 68 has a gear 69 which meshes with a beveled gear 70 on the main drive shaft 39. Said shaft 39 is driven from the ground wheel 1 by any suitable connection such as a chain or belt 71 and a clutch 72 controlled by a lever 73 which is capable of operation to discontinue the driving connection between the parts 1 and 39 so that the operation of the header mechanism may be stopped or started at will by the operator.

Having in view the foregoing, it will be observed that the upper header wheel 66 is driven by a suitable train of gearing and shafts leading to the wheel 1, and said header wheel 66 is connected with the lower header wheel 20 hereinbefore mentioned, by means of a header chain 74.

The links of the header chain 74 are constructed peculiarly, as shown in Fig. 6, each having a lateral extension 75 to which is attached a header device. Each header device consists of a supporting arm 76 bolted between its ends to the extension 75 of a chain link and provided at one end with a guide member or lug 77 coöperating with a longitudinal guide 78 carried by the header frame. The opposite end of the arm 76 supports a pair of jaws 79 and 80, the jaw 79 being stationary while the jaw 80 is movable, being pivoted at 81 and normally held in closed position in relation to the jaw 79 by a spring 82 interposed between the lower ends of said jaws. The adjacent edges of the jaws 79 and 80 are notched at 83 to form a clearance opening and the upper portions of the jaws are slightly spaced apart and formed with biting edges 84. Furthermore, each set of jaws 79 and 80 have their upper ends bent slightly at an angle and oppositely beveled to provide a mouth converging inwardly toward the portions 84 of the jaws. The movable jaw 80 carries an inclined knife or cutter 85 which extends therefrom in an angular direction beneath it and beneath the coöperating stationary jaw.

The header chain 74 with the header devices carried by the links thereof, is associated with a clearing member or board 86 which inclines at practically the same angle inwardly as the frame of the header mechanism, being supported by the latter in any substantial way, as upon brackets 87. The clearing member 86 is arranged longitudinally of the header frame over the outermost lap of the header chain, and said member 86 lies in a plane practically at a right angle to the plane of the body portions of the header devices with which it coöperates and at its upper end, the clearing member 86 is curved, as shown at 86' and projects at the curved portions a distance sufficient to forcibly remove a severed head of corn from the grasp of the jaws of each header device in a manner to be more fully described hereinafter.

Supported above the clearing member or board 86 is a gage member 88 supported adjustably on the member 86 by brackets 87'. The gage member 88 extends longitudinally of and substantially parallel to the member 86, but is spaced from the adjacent sides of the jaws of the header devices a much greater distance than the latter member. It may be noted that the jaws of the header devices are so formed that the bodies thereof extend at an obtuse angle to the arms by which they are carried and the upper extremities of the jaws which have the entrance mouth to receive the stalk to be operated on, are bent so as to project beneath a guide board 89, shown clearly in Figs. 6 and 10. The guide board 89 is spaced from the gage member 88, however.

At its lower end, the frame 17 is adjacent to the gathering board 51 and the header wheel 20 is connected by a drive chain 90 with a sprocket shaft 91 that is universally connected at 92 with a sprocket shaft 93 which carries the inner sprocket about which the gathering chain 94 passes, said gathering chain also passing around the outer sprocket 95.

At about the point of convergence of the innermost portions of the gathering boards 50 and 51 is located certain feeding and feed controlling mechanism, of which the combined driving and feed chain 55 really forms a part. The feeding wheel 21 is toothed and the teeth thereof are adapted to engage the stalks as the latter are fed thereto, whereby a single stalk only may be forced into the jaws of each header device as the latter is carried around on the header chain 74. The stalks will, of course, be engaged initially and carried rearwardly to the feeding mechanism by the gathering chains 52 and 94. After the stalks leave the gathering chains, they move into close contact with a yielding pressure plate 96, shown clearly in Fig. 5, being held in proper coöperation with the pressure plate by the inner lap of the chain 55, said portion of the chain being supported or held in a proper position for the coöperation described by means of a block 97 just in rear of the sprocket 56. The pressure plate 96 is pivotally connected at its front portion to an arm 98 upon a supporting board 99 and at its rear portion a rod 100 is connected with the plate and holds the latter in its normal position by reason of the pressure of the spring 101 coacting with said rod.

Pivoted at 102 to the inner side of the plate 96 is a cutoff 103, the operating end of which is adapted to pass through an opening in the plate. A lever 104 is connected at one end with the cutoff 103 by a link 105 and the opposite end of the lever is connected by a link 106 with an auxiliary pressure member 107. The member 107 is pivoted at one end to the inner end of the plate 96 and said plate 96 is held normally in the position shown in Fig. 5 by a spring actuated rod 108. At its free extremity, the member 107 is notched and the teeth at the peripheral portion of the feeding wheel 59 are adapted to operate through said notch. In rear of the members 96 and 107 is a floating shoe 109 supported by links 110 and also held in its normal position by a spring actuated rod 111. The shoe 109 extends at its rear end adjacent to a guiding arm 112 which is attached to the lower front end of the guide board 89.

The action of the gathering chains 52 and 94 has been described and carrying further the description of the operation of the feeding means, it will be observed that when a stalk of corn has moved rearwardly between the chain 55 and pressure plate 96 to a point where it engages the feeding wheel 21, a tooth of the wheel 59 will engage and force the stalk against the auxiliary pressure member 107, moving the same laterally in a pivotal manner. The movement of the member 107 tilts the lever 104 and the latter actuates the cutoff 103 to project the operating end of said cutoff across the space between the member 55 and 96. In this manner, the cutoff 103 prevents more than a single stalk from being engaged and carried to a single header device at a time, any other stalks between the parts 55 and 96 being positively withheld from engagement by the wheel 21 until the first engaged stalk is carried to a point permitting the member 107 to return to its normal position, whereupon the cutoff 103 will be withdrawn from the space between the chain 55 and plate 96. After the stalk leaves the auxiliary pressure member 107, it is carried rearwardly by a tooth of the wheel 21 and is firmly held against the wheel by the pressure shoe 109 until the stalk is engaged by the guide arm 112.

It will be understood that the movement of the header devices is so timed that a header device is in proper position to receive the stalk between its jaws as the feeding wheel delivers the stalk thereto at a point adjacent to the front end of the arm 112. The rear portion of the arm 112 inclines laterally to a slight degree and this portion, together with the guide board 89, shoves the stalk of corn into the space between the edges 84 of the jaws of the header device, the movable jaw 80 yielding in the above action and the two jaws firmly gripping the stalk therebetween. Once the header device has been engaged with the stalk, the latter is carried on toward the rear of the machine by the movement of the header chain and the progressive movement of the machine itself, the jaws of the header device slipping upward on a stalk in this operation before maintaining a firm grip thereon.

The gage board 88 prevents the stalk from slipping downwardly longitudinally of the jaws 79 and 80 until the head of the stalk starts to pass beneath the upper end portion of said gage member. Because of the location of the cutting knife 85, just as soon as the stalk comes into contact with the knife, it will be cleanly severed at a point very near to the head and just below the header jaws. When the head of the stalk is severed from the body thereof, the jaws retain their grip on the severed head portion and carry the same on upwardly to the upper end of the header frame until the curved portion 86' of the clearing board 86 engages the head and forcibly carries the same from between the jaws 79 and 80. The disengagement of the severed head of the stalk from the header device will happen just as the head is above a chute 113 leading to a hopper 115 (see Figs. 1 and 8), so that the head will fall into the hopper. A conveyer 114 is arranged to carry the heads of the corn from the hopper 115 and deliver the same either to the ground at one side of the machine, or to any receptacle or point of deposit.

It will be noted that beneath the header frame are located spaced guide rods 116 between which the stalks are adapted to move as they pass through the machine and are operated upon by the header mechanism. The guide rods 116 are utilized to engage with the stalks a short distance below the points where they are grasped by the header devices in order to prevent any tendency of the stalks to be jerked or to receive any unauthorized movement which would interfere with the proper operation of the machine.

From the foregoing, it will be apparent that the operation of the various mechanism above set forth, in feeding the stalks to the header mechanism, in severing the heads from the stalks, and depositing the same upon a conveyer, is entirely automatic and the various parts of the machine are adapted for considerable adjustment so as to accommodate them for different conditions incidental to actual service.

It is contemplated that changes may be made in the construction of the machine in so far as detail parts and arrangement of parts are concerned, in accordance with the scope of the claims hereinafter appended.

Having thus described the invention, what is claimed as new is:

1. In a corn heading machine, a support adapted to be advanced over a field, a header mechanism mounted on said support and movable longitudinally thereof, and means to engage stalks with one end and to discharge said stalks at the other end of said mechanism, the header mechanism comprising devices to yieldingly grip the stalks when engaged therewith.

2. In a corn heading machine, a support adapted to be advanced over a field, an upwardly and rearwardly inclined header mechanism mounted on said support and movable longitudinally thereof, and means to engage stalks with the lower end and to discharge said stalks at the upper end of said mechanism, the header mechanism comprising devices having yielding and sliding gripping action on the stalks as the latter move toward the upper end of the mechanism.

3. In a corn heading machine, a support adapted to be advanced over a field, an upwardly and rearwardly inclined header mechanism mounted on said support and movable longitudinally thereof, and means to engage stalks with the lower end and to discharge said stalks at the upper end of said mechanism, the header mechanism comprising a continuously moving chain and devices thereon to grip the stalks.

4. In a corn heading machine, a support adapted to be advanced over a field, a header mechanism mounted on said support and movable longitudinally thereof, means to engage stalks with one end and to discharge said stalks at the other end of said mechanism, the header mechanism comprising devices to yieldingly grip the stalks when engaged therewith, and means coacting with the header mechanism to cause severance of portions of the stalks intermediate the ends of the header mechanism.

5. In a corn heading machine, a support adapted to be advanced over a field, a header mechanism mounted on said support and movable longitudinally thereof and including devices to grip stalks, feeding means at one end of the header mechanism to engage stalks therewith, means coacting with the header mechanism to cause severance of portions of the stalks intermediate the ends of the mechanism, and means at the other end of said header mechanism to forcibly discharge the severed portions of the stalks therefrom.

6. In a corn heading machine, a support adapted to be advanced over a field, a header mechanism mounted on said support and movable longitudinally thereof and including a continuously moving chain and header devices to grip stalks, feeding means at one end of the header mechanism to engage stalks therewith, means coacting with the header mechanism to cause severance of portions of the stalks intermediate the ends of the mechanism, and means at the other end of said header mechanism to forcibly discharge the severed portions of the stalks therefrom.

7. In a corn heading machine, a support adapted to be advanced over a field, a header mechanism mounted on said support and movable longitudinally thereof, means to engage stalks with one end and to discharge said stalks at the other end of said mechanism, means to cause severance of portions of the stalks at a point intermediate the ends of the header mechanism, and means to control the point of severance of the stalks by the severing means.

8. In a corn heading machine, a support adapted to be advanced over a field, a header mechanism mounted on said support and movable longitudinally thereof, means to engage stalks with one end and to discharge said stalks at the other end of said mechanism, means to cause severance of portions of the stalks at a point intermediate the ends of the header mechanism, and adjustable gage means to control the point of severance of the stalks by the severing means.

9. In a corn heading machine, the combination of header mechanism comprising an endless chain, header devices carried by said chain, means for moving the chain, and a feeding member arranged to feed stalks individually to the header devices while the latter are moving.

10. In a corn heading machine, the combination of header mechanism comprising an endless chain, header devices carried by said chain, means for moving the chain, a feeding wheel arranged to engage stalks and deliver the same to the header devices, and means coöperating with said wheel to cause the same to engage a single stalk at a time.

11. In a corn heading machine, the combination of header mechanism comprising a plurality of header devices, and means for feeding stalks to said header devices comprising a cutoff to cause a single stalk to be fed to each header device.

12. In a corn heading machine, the combination of header mechanism comprising a plurality of header devices each capable of gripping a stalk, means for operating said devices, and stalk feeding mechanism including means for separately engaging the stalks with the header devices, each header device carrying a knife and means controlling the action of said knife on the stalks.

13. In a corn heading machine, the combination of header devices adapted to grip a stalk, means for separately feeding stalks to the header devices, and means carried by each header device for cutting the stalks so that the severed portions thereof will be supported by the header devices.

14. In a corn heading machine, the combination of header mechanism including a plurality of progressively moving header devices, stalk feeding means for engaging the stalks, one at a time, with each header device, a knife associated with each header device to sever the stalks engaged therewith, means for temporarily withholding the knives from action upon the stalks, and means for detaching the severed portions of the stalks from the header devices at a predetermined point in the movement of the latter.

15. In a corn heading machine, the combination of header devices, means for feeding stalks thereto comprising a feed wheel, a yielding pressure member coacting with said wheel, and means operable by said pressure member to temporarily prevent feeding movement of stalks to the header devices.

16. In a corn heading machine, the combination of header mechanism, means for feeding stalks to said header mechanism comprising a yielding pressure member, means for forcing a stalk against said pressure member to feed said stalks to the header mechanism, and means operable by movement of the pressure member for temporarily preventing feeding of other stalks to the header mechanism.

17. In a corn heading machine, the combination of header mechanism, means for feeding stalks to the header mechanism comprising a pressure member, a feeding element arranged to engage a stalk with the pressure member and feed the stalk to the header mechanism, means permitting movement of the pressure member when the stalk is engaged therewith, and a cutoff operable by the pressure member when moved.

18. In a corn heading machine, the combination of header mechanism comprising a plurality of header devices capable of gripping severed heads of stalks, means for imparting movement to said devices, means for engaging the stalks with the header devices, means for severing portions of the stalks at a predetermined point in the movement of the header devices, and a clearing member for disengaging the gripped severed portions of stalks from the header devices.

19. A header device for corn heading machines comprising a pair of jaws, yielding means for holding said jaws closed, and means for forcing a stalk between said jaws so as to be gripped thereby.

20. A header device for corn heading machines comprising jaws, means for forcing a stalk between said jaws, and a knife carried by one of the jaws to sever a portion of the stalk engaged thereby.

21. A header device for corn heading machines comprising jaws, means for forcing a stalk between said jaws, a knife carried by one of the jaws to sever a portion of the stalk engaged thereby, and gage means coöperating with the header device to control the severing action of the knife.

22. A header device for corn heading machines comprising a pair of jaws, a knife carried by one of said jaws, and means for individually engaging the stalks with said knife and arranged rectangularly of the latter.

23. A header device for corn heading machines comprising coöperating jaws, means for imparting bodily movement to the jaws, guide means for holding the jaws rigid while moving, and yieldable means permitting movement of the jaws relative to one another.

In testimony whereof I affix my signature in presence of two witnesses.

JOSEPH M. FORSHEE.

Witnesses:
W. L. HAYNES,
D. Z. WIEHE.

---

Copies of this patent may be obtained for five cents each, by addressing the "Commissioner of Patents, Washington, D. C."